3,177,083
ANTI-STATIC TREATMENT OF GLASS BEADS
Eduard R. de Vries, Huntingdon, Pa., assignor to Prismo Safety Corporation, Huntingdon, Pa., a corporation of Pennsylvania
No Drawing. Filed Feb. 13, 1962, Ser. No. 172,877
9 Claims. (Cl. 106—287)

The present invention relates to the anti-static treatment of particulate material and more particularly to the treatment of small glass beads or spheres to prevent the accumulation of a static charge thereon.

In the past it has been found that when small glass spheres are being dispensed from a hopper that the friction of the small glass sphere surfaces against each other results in the building up of a static charge. Since each glass sphere is an insulator, past attempts to ground the entire mass of glass spheres in the hopper or to bleed off the static in other ways have not been successful. This problem is especially prevalent in connection with glass spheres of high index of refraction which consist mainly of oxides other than silica and have a very high surface resistivity.

It has been found that wetting the mass of glass spheres with water will eliminate the static; however, when even low amounts of water are present the mass of glass spheres is no longer free-flowing but takes on the consistency of wet cement. In this wet state, the spheres cannot be evenly dispensed from a hopper and are not useful for reflectorizing surfaces.

It is therefore an object of the present invention to provide a method of treating a mass of glass spheres to eliminate the accumulation of static electricity thereon while maintaining the free flowing characteristics of the mass of spheres.

A further object of the present invention is to provide a composition suitable for use in the treatment of glass spheres to render them free of static electricity and free flowing.

A further object of the invention is to provide an improved glass sphere product which is free of static electricity and free flowing when stored in a mass.

Other objects and the nature and advantages of the instant invention will be apparent from the following description.

It has now been discovered that free flowing, static-free glass spheres can be prepared by treating the spheres with a mixture of a colloidally divided silica, water and an alkyl quaternary ammonium salt. Treatment of glass spheres with such a mixture has been found to render the glass spheres anti-static and yet remain free flowing.

The silica particles suitable for use in this invention are of colloidal size. There are a number of such colloidal silicas available commercially. A suitable colloidal silica which is available commercially is known as Cab-O-Sil.

The alkyl quaternary ammonium salt is preferably one sold under the name of Arquad 12–50. Arquad 12–50 is an alkyl trimethyl ammonium chloride corresponding to the formula:

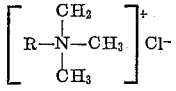

wherein the R group is alkyl. The average composition has the following alkyl groupings:

| | Percent |
|---|---|
| Dodecyl | 90 |
| Tetradecyl | 9 |
| Octadecenyl | 1 |

It is a liquid product made up of 50% of the alkyl quaternary ammonium salt, approximately 35% isopropanol and approximately 15% water.

The alkyl quaternary ammonium salt alone was tried in the treatment of glass spheres but was not found satisfactory since the resulting spheres were not free flowing after treatment. The addition of the colloidal silica and water to the alkyl quaternary ammonium salt was found to solve this problem. It is the mixture of the colloidal silica with the other ingredients which results in the treated glass spheres being both free of static and still free flowing.

It has been found that satisfactory results are obtained when using compositions in the following proportions per 100 lbs. of glass spheres:

| | | |
|---|---|---|
| Alkyl quaternary ammonium salt | ml | 1–100 |
| Colloidal silica | grams | 5–100 |
| Water | ml | 1–100 |
| Isopropanol | ml | 0–100 |

The preferred range was found to be as follows per 100 lbs. of glass spheres:

| | | |
|---|---|---|
| Alkyl quaternary ammonium salt | ml | 25–75 |
| Colloidal silica | grams | 25–75 |
| Water | ml | 25–75 |
| Isopropanol | ml | 25–75 |

A specific example is as follows:

100 pounds of small high index glass spheres having diameters in the range of 1–50 mils are mixed with the following composition:

| | | |
|---|---|---|
| Alkyl quaternary ammonium salt (Arquad 12–50) | ml | 38 |
| Colloidal silica (Cab-O-Sil) | grams | 40 |
| Water | ml | 25 |
| Isopropanol | ml | 25 |

After the mixture is thoroughly mixed, the glass spheres were found to be free of static and free flowing.

Additional examples of suitable compositions are shown in the following table:

| Arquad 12–50, ml. | Colloidal Silica, grams | Water, ml. | Isopropanol, ml. |
|---|---|---|---|
| 22 | 27 | 28 | 83 |
| 24 | 24 | 30 | 90 |
| 16 | 23 | 50 | 0 |

If desired, a small amount of glycerol can be added to the composition.

It will be obvious to those skilled in the art that various changes may be made without departing from the spirit of the invention and therefore the invention is not limited to what is described in the specification but only as indicated in the appended claims.

What is claimed is:

1. A method of treating a mass of glass spheres to render them free of static and yet free flowing which comprises mixing 100 pounds of said spheres with the following composition:

| | | |
|---|---|---|
| alkyl trimethyl ammonium chloride | ml | 1–100 |
| colloidal silica | gr | 5–100 |
| water | ml | 1–100 |
| isopropanol | ml | 0–100 |

2. A method of treating a mass of glass spheres to render them free of static and yet free flowing which comprises mixing 100 pounds of said spheres with the following composition:

| | | |
|---|---|---|
| alkyl trimethyl ammonium chloride | ml | 25–75 |
| colloidal silica | gr | 25–75 |
| water | ml | 25–75 |
| isopropanol | ml | 25–75 |

3. A method of treating a mass of glass spheres to render them free of static and yet free flowing which comprises mixing 100 pounds of said spheres with the following composition:

| | | |
|---|---|---|
| alkyl trimethyl ammonium chloride | ml | 38 |
| colloidal silica | gr | 40 |
| water | ml | 25 |
| isopropanol | ml | 25 |

4. A composition suitable for the treatment of a mass of glass spheres to render them free of static and yet free flowing comprising a mixture of the following ingredients per 100 pounds of spheres:

| | | |
|---|---|---|
| alkyl trimethyl ammonium chloride | ml | 1–100 |
| colloidal silica | gr | 5–100 |
| water | ml | 1–100 |
| isopropanol | ml | 0–100 |

5. A composition suitable for the treatment of a mass of glass spheres to render them free of static and yet free flowing comprising a mixture of the following ingredients per 100 pounds of spheres:

| | | |
|---|---|---|
| alkyl trimethyl ammonium chloride | ml | 25–75 |
| colloidal silica | gr | 25–75 |
| water | ml | 25–75 |
| isopropanol | ml | 25–75 |

6. A composition suitable for the treatment of a mass of glass spheres to render them free of static and yet free flowing comprising a mixture of the following ingredients per 100 pounds of spheres:

| | | |
|---|---|---|
| alkyl trimethyl ammonium chloride | ml | 38 |
| colloidal silica | gr | 40 |
| water | ml | 25 |
| isopropanol | ml | 25 |

7. Glass spheres of small particle size which are free of static and free flowing when contained in bulk, said spheres having been coated with a mixture of the following ingredients per 100 pounds of spheres:

| | | |
|---|---|---|
| alkyl trimethyl ammonium chloride | ml | 1–100 |
| colloidal silica | gr | 5–100 |
| water | ml | 1–100 |
| isopropanol | ml | 0–100 |

8. Glass spheres of small particle size which are free of static and free flowing when contained in bulk, said spheres having been coated with a mixture of the following ingredients per 100 pounds of spheres:

| | | |
|---|---|---|
| alkyl trimethyl ammonium chloride | ml | 25–75 |
| colloidal silica | gr | 25–75 |
| water | ml | 25–75 |
| isopropanol | ml | 25–75 |

9. Glass spheres of small particle size which are free of static and free flowing when contained in bulk, said spheres having been coated with a mixture of the following ingredients per 100 pounds of spheres:

| | | |
|---|---|---|
| alkyl trimethyl ammonium chloride | ml | 38 |
| colloidal silica | gr | 40 |
| water | ml | 25 |
| isopropanol | ml | 25 |

References Cited in the file of this patent

UNITED STATES PATENTS

| | | |
|---|---|---|
| 2,717,842 | Vitalis | Sept. 13, 1955 |
| 2,917,401 | Noguchi et al. | Dec. 15, 1959 |
| 3,044,962 | Brunt et al. | July 17, 1962 |

FOREIGN PATENTS

| | | |
|---|---|---|
| 1,133,471 | France | Jan. 26, 1959 |

OTHER REFERENCES

Armour and Company, "Arquads," pp. 1–3, received in Patent Office February 1950, note page 2.